United States Patent [19]

Saigano

[11] Patent Number: 5,014,296

[45] Date of Patent: May 7, 1991

[54] FACSIMILE TERMINAL DEVICE HAVING VOICE MESSAGE RECORDING CAPABILITY

[75] Inventor: Masahiro Saigano, Chikushino, Japan

[73] Assignee: Matsushita Electric Industrial Co., Ltd., Osaka, Japan

[21] Appl. No.: 152,426

[22] Filed: Feb. 4, 1988

[30] Foreign Application Priority Data

Feb. 4, 1987 [JP] Japan .................................. 62-24080

[51] Int. Cl.$^5$ ....................... H04M 1/64; H04M 11/00
[52] U.S. Cl. ......................................... 379/67; 379/88; 379/100
[58] Field of Search ............................ 379/67, 88, 100

[56] References Cited

U.S. PATENT DOCUMENTS

| 4,815,121 | 3/1989 | Yoshida | 379/67 |
| 4,823,375 | 4/1989 | Yoshida | 379/100 |
| 4,829,559 | 5/1989 | Izawa et al. | 379/96 |
| 4,856,049 | 8/1989 | Streck | 379/67 |

FOREIGN PATENT DOCUMENTS

| 0170277 | 10/1983 | Japan | 379/100 |
| 0103458 | 6/1984 | Japan | 379/93 |

OTHER PUBLICATIONS

"Procedures for Document Facsimile Transmission in the General Switched Telephone Network", T.30 International Telegram and Telephone Consultative Committee; pp. 69–117, 1984.

Primary Examiner—Thomas W. Brown
Attorney, Agent, or Firm—Wenderoth, Lind & Ponack

[57] ABSTRACT

A facsimile terminal device includes an interface circuit for interfacing with a telephone line and a first switching circuit for selectively connecting the telephone line to the interface circuit and a telephone set. Signal detecting circuitry is provided, coupled to the interface circuit, for detecting and identifying a received signal on the telephone line. Incoming message recording circuitry is provided for recording a voice message received on the telephone line, and image signal receiving circuitry is provided for receiving and processing an image signal received on the telephone line. A second switching circuit is provided for selectively connecting the interface circuit to the incoming message recording circuitry and the image signal receiving circuitry. A control microprocessor is provided for causing the first and second switching circuits to connect the telephone line to the image signal receiving circuitry when the received signal is identified by the signal detecting circuitry as an image signal. Furthermore, upon receipt of the image signal, the control microprocessor causes the first switching means to connect the telephone line to the telephone set and activates a ringing device when the received signal is identified by the signal detecting circuit as a PRI-Q signal, the PRI-Q signal being received after the image signal and denoting a request to establish a voice connection. The control microprocessor then causes the first and second switching circuits to connect the telephone line to the incoming message recording circuitry when the telephone set remains on-hook for a predetermined period of time upon activation of the ringing device.

6 Claims, 2 Drawing Sheets

FACSIMILE TERMINAL DEVICE HAVING VOICE MESSAGE RECORDING CAPABILITY

BACKGROUND OF THE INVENTION

1. Field of the Invention

This invention relates to a terminal apparatus which receives voice and image signals.

2. Description of the Related Art

A facsimile apparatus is an example of a terminal apparatus which can receive and transmit image signals through a telephone line. Some facsimile devices can function to call the other operator without cutting off the telephone circuit after communication of the image signal. A facsimile device having such a function includes a button which is operated when one operator wants to call the other operator without cutting off the telephone circuit, a PRI-Q signal outputting circuit for outputting PRI-Q signals when the button is operated (the PRI-Q signals include the PRI-EOM signal, the PRI-MPS signal and the PRI-EOP signal as described in recommendation Rec. T30 of the International Telegram and Telephone Consultative Committee, and are used as the signalling for calling the other operator without cutting off the telephone circuit), a PRI-Q signal detection circuit for detecting PRI-Q signals from the telephone circuit, and an indicator which indicates the detection of the PRI-Q signals.

However, when the operator of the called party is absent, the operator of the calling party must recall until the other operator returns.

SUMMARY OF THE INVENTION

It is an object of this invention to provide a terminal apparatus which can receive image signals and which can record a message from the calling party automatically even in the absence of the operator of the calling party.

DETAILED DESCRIPTION OF PREFERRED EMBODIMENT

Figure 1:
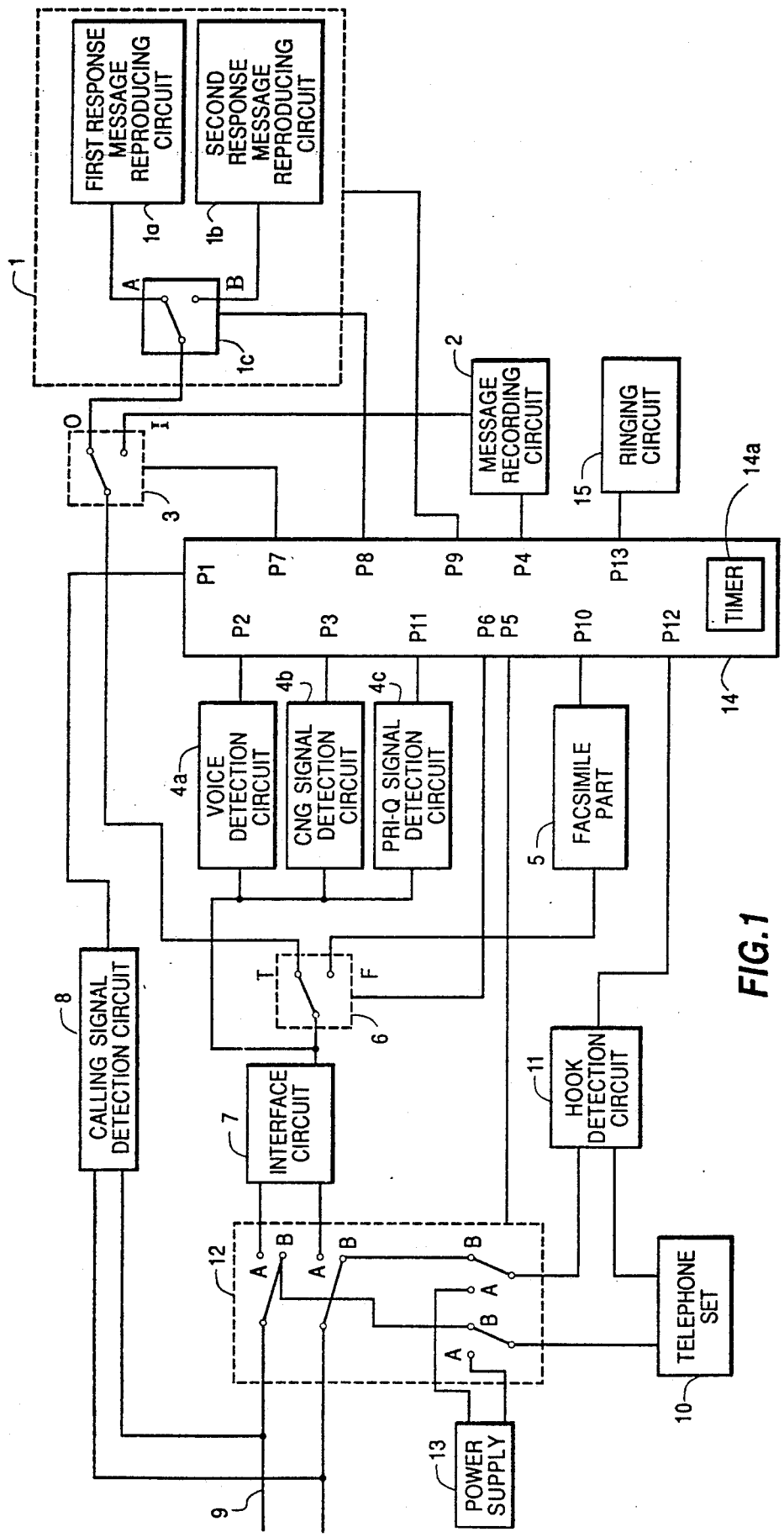
FIG. 1 is a block diagram of a terminal apparatus of an embodiment of the present invention.

Referring now to the drawings, an embodiment of the present invention is described hereafter.

As a preliminary matter, it is noted that in order to simplify the drawings, FIG. 1 depicts only single line communication lines to the right of the calling signal detection circuit 8, the interface circuit 7, and the hook detection circuit 11.

FIG. 1 is a block diagram of a terminal apparatus of an embodiment of the present invention. As shown in FIG. 1, the response message circuit 1 includes first and second response message reproducing circuits 1a and 1b for outputting first and second response messages and a first change-over switch 1c. The incoming message recording circuit 2 is for recording voice signals (an incoming message) from the calling party through the telephone circuit. The second change-over switch 3 selectively connects the response message circuit 1 and the incoming message recording circuit 2 to the telephone circuit 9. The audio signal detection circuit 4a detects the presence or absence of an audio signal in the telephone circuit 9. The CNG signal detection circuit 4b detects the CNG signals (that is, the calling tone as described in recommendation Rec. T30 of the International Telegram and Telephone Consultative Committee), and the PRI-Q signal detection circuit 4c detects the PRI-Q signals. The facsimile part 5 receives image signals from the calling party. The third change-over switch 6 selectively connects the signal from the calling party to the facsimile part 5, the response message circuit 1 or the incoming message recording circuit 2. The interface circuit 7 is for connection and disconnection of the telephone circuit 9. The calling signal detection circuit 8 detects the calling signal on the telephone circuit 9. The telephone set 10 is connected to the telephone circuit 9 in parallel with the terminal apparatus. The hook detection circuit detects whether the telephone set 10 is in an on-hook state or an off-hook state. The fourth change-over switch 12 selectively connects the terminal apparatus and the telephone set 10 to the telephone circuit 9. The power supply circuit 13 supplies a constant electric current to the telephone set 10 while the telephone set 10 is disconnected from the telephone circuit 9. The control circuit 14 is constituted by a microcomputer and controls activation of the terminal device.

Figure 2:
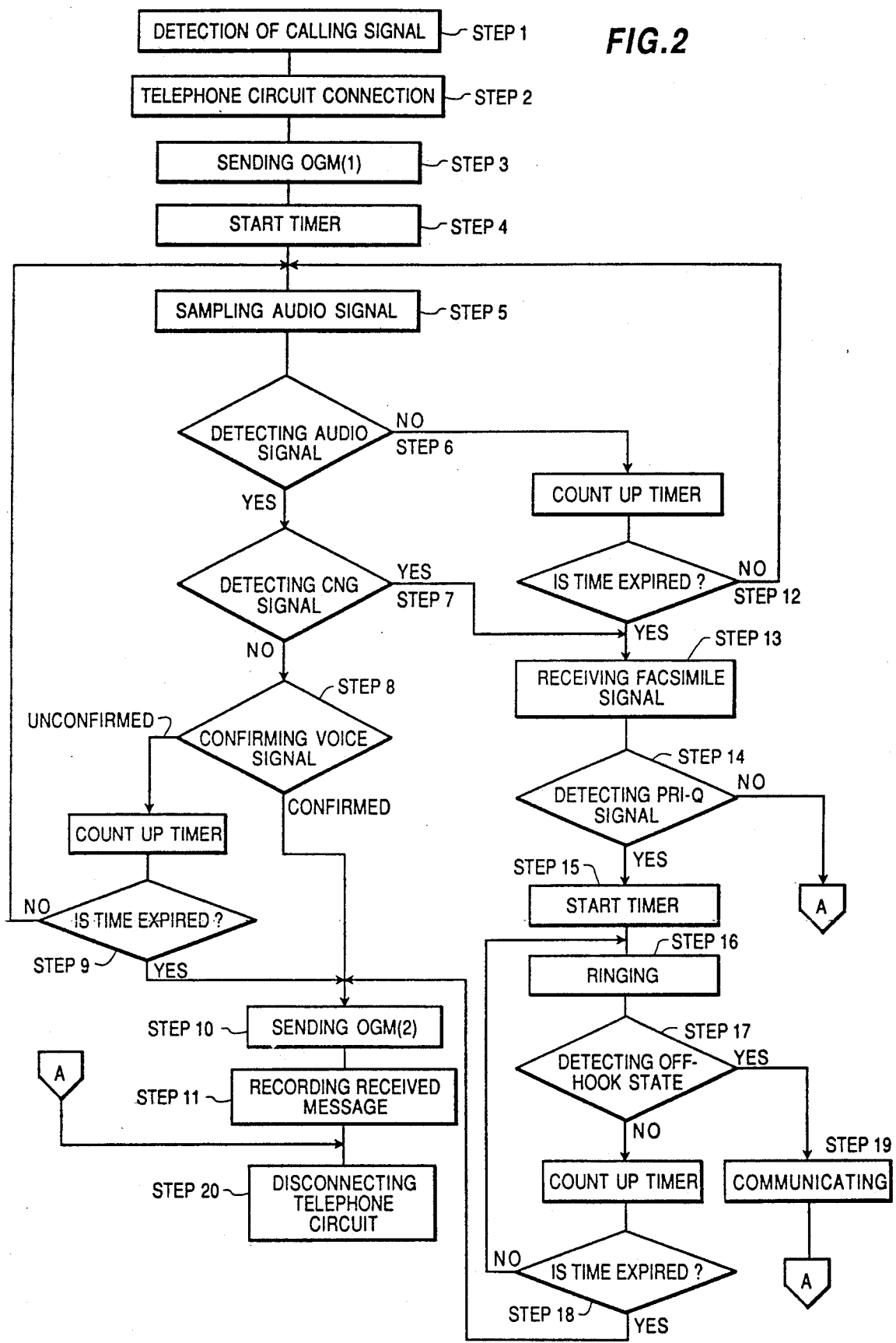
FIG. 2 is a flow chart showing the operation of the terminal apparatus of FIG. 1.

Referring now to the flow chart shown in FIG. 2, the operation of the facsimile device having an automatic telephone answering capability is described hereafter. When the calling signal arrives, the calling signal is detected by the calling detection circuit 8. The detection signal is then inputted to a terminal P1 of the control circuit 14 (step 1). Responding to this detection signal, the control circuit 14 outputs a control signal from an output terminal P5 to connect the telephone circuit by switching over the fourth switch 12 to the "A" side from the "B" side. The terminal apparatus is thus connected to telephone circuit 9 (step 2). Then, the control circuit 14 outputs a control signal from the output terminal P6 to switch the third change-over switch 6 to the "T" side. Further, the control circuit 14 switches the second change-over switch 3 to the "O" side by outputting a control signal from an output terminal P7. Still further, the control circuit 14 switches the first change-over switch 1c of response message circuit 1 to the "A" side by outputting a control signal from its output terminal P8. Then the control circuit 14 activates the response message circuit 1 by outputting a control signal from an output terminal P9. The response message circuit 1 outputs a first response message, such as "Hello, this is ***, may I have your name, please", to the telephone circuit 9 from the first response message reproducing circuit 1a (step 3). The control circuit 14 causes a built-in timer 14a to start count of a predetermined time period (step 4). The timer 14a is designed, for example, to output a time-up signal when a period of 7 seconds is counted. The signal from the telephone circuit 9 is inputted to the audio detection circuit 4a, the CNG signal detection circuit 4b and the PRI-Q signal detection circuit 4c through the interface circuit 7. A detection signal of voice detection circuit 4a is inputted to an input terminal P2 of the control circuit 14, a detection signal of the CNG signal detection circuit 4b is inputted to an input terminal P3 of the control circuit 14, and a detection signal of the PRI-Q signal detecting circuit 4c is inputted to an input terminal P11 of the control circuit 14. The control circuit 14 begins sampling of the inputted signal on the input terminal P2 for determining whether or not an audio signal has been detected (step 5). When an audio signal is not detected, the control circuit 14 reads the timer 14a to determine whether the predetermined time period has expired (step 12). When the predetermined time period has not yet expired, the control returns to step 5. When the predetermined time period has expired (when no audio state is detected for 7 seconds), the control proceeds to step 13.

When an audio signal (such as a voice signal from the calling party, noise surrounding the handset of the calling party, or a control signal sent from calling party when the facsimile device of the caller is in an automatic transmission mode) from calling party responding to the first response message is detected, the control circuit 14 then determines whether the audio signal is a CNG signal (step 7). When a CNG signal is detected the control proceeds to step 13.

When a CNG signal is not detected at step 7, and when the frequency (or the cycle) of the audio signal is not constant, the control circuit 14 confirms (step 8) that the audio signal is a voice signal or noise and the control proceeds to step 10. On the other hand, at step 8, when the audio signal detected has a constant frequency, the control proceeds to step 9. At step 9, the timer 14a is read to determine whether the predetermined time period has expired. When the predetermined time period 14a has not expired, the control returns to step 5. In this way, the detection of the CNG signal is repeated until the timer 14a has expired, even when the control circuit 14 fails to initially detect a CNG signal. At step 9, when the timer 14a expires, the control proceeds to step 10.

At step 10, the control circuit 14 switches the third change-over switch 6 to the "T" side by outputting a control signal from the output terminal P6, switches the second change-over switch 3 to the "O" side by outputting a control signal from the output terminal P7, and switches the first change-over switch 1c of response message circuit 1 to the "B" side by outputting a control signal from the output terminal P8. Then, the control circuit 14 sets the response message circuit 1 to an active state by outputting a control signal on the output terminal P9 for sending a second response message, such as "Would you please leave your name and message after you hear the recording tone", from the second response message recording circuit 1b to the telephone circuit 9. The control circuit 14 changes the second change-over switch 3 to the "I" side by outputting a control signal from the output terminal P7 and sets the incoming message recording circuit 2 to an active state by outputting a control signal from the output terminal P4 for recording a message from the calling party onto a recording medium (such as a magnetic tape) of the incoming message recording circuit 2 (step 11). When the recording operation of the message from the calling party is completed, the control proceeds to step 20.

At step 13, the control circuit 14 switches the third change-over switch 6 to the "F" side by outputting a control signal from the output terminal P6 and switches the facsimile part 5 into an active state for receiving an image signal (facsimile signal) from the calling party. When the receiving operation of the image signal is completed, the control proceeds to step 14.

At step 14, the control circuit 14 determines whether a PRI-Q signal is detected by the PRI-Q signal detection circuit 4c. If a PRI-Q signal is detected, the control proceeds to step 15. At step 15, the control circuit 14 activates the timer 14a for counting of another predetermined time period, for example a period of 20 seconds. At step 16, the control circuit 14 activates a ringing device 15 for calling the operator.

At step 17, when the operator of the called party lifts up the handset of telephone set 10 in response to the ringing, the telephone set 10 enters an off-hook state which is detected by the hook detection circuit. The control then proceeds to step 19 in which the operators of each side can verbally communicate.

If the off-hook state has not been detected within the predetermined time period of 20 seconds and the timer 14a expires, the control proceeds to step 10. At step 10, the control circuit 14 switches the third change-over switch 6 to the "T" side by outputting a control signal from the output terminal P6, switches the second change-over switch 3 to the "O" side by outputting a control signal from the output terminal P7 and switches the first change-over switch 1c of the response message circuit 1 to the "B" side by outputting a control signal from the output terminal P8. Then the control circuit 14 sets the second response message reproducing circuit 1b to an active state for sending the second response message to the telephone circuit 9. Then the control circuit 14 switches the second change-over switch to the "I" side by outputting a control signal from the output terminal P7, and sets the incoming message recording circuit 2 to an active state by outputting a control signal from the output terminal P4 for recording the supplemental message from caller (step 11).

When the recording operation of the message from the calling party is completed, the control proceeds to step 20 in which the telephone circuit 9 disconnected and the next signal is awaited.

As described above, the terminal apparatus of this invention includes a receiving circuit for receiving an image signal, a detection circuit for detecting a PRI-Q signal on the telephone circuit, and incoming message recording circuit for recording a voice signal on the telephone circuit, a ringing device for activating in response to the detection of a PRI-Q signal, and a circuit for activating the incoming message recording circuit when the ringing device has been activated for predetermined time whereby the operator of the calling party can send a supplemental message to the other operator even when the other operator is absent.

What is claimed is:

1. A terminal device comprising:
   interface means for interfacing with a telephone line;
   first switching means, coupled to said interface means, for selectively connecting the telephone line to said interface means and a telephone set;
   signal detecting means, coupled to said interface means, for detecting and identifying a received signal on the telephone line;
   incoming message recording means for recording a voice message received on the telephone line;
   image signal receiving means for receiving and processing an image signal received on the telephone line;
   second switching means, coupled to said interface means and said incoming message recording means and said image signal receiving means, for selectively connecting said interface means to said incoming message recording means and said image signal receiving means;
   ringer connecting means for connecting to a ringing device;

hook detecting means, having means for connection to the telephone set, for detecting an off-hook condition of the telephone set; and, control means, coupled to said first and second switching means and said signal detecting means and said incoming message recording means and said image signal receiving means and said hook detecting means and said ringer connecting means, for causing said first and second switching means to connect the telephone line to said image signal receiving means when the received signal is identified by said signal detecting means as an image signal; and, upon receipt of the image signal, for causing the first switching means to connect the telephone line to the telephone set and for activating the ringing device when the received signal is identified by said signal detecting means as an operator intervention signal, the operator intervention signal being received after the image signal and denoting a request to establish a voice connection; and for causing said first and second switching means to connect the telephone line to said incoming message recording means when the telephone set remains on-hook for a predetermined period of time upon activation of the ringing device.

2. A terminal device as recited in claim 1, further comprising:

recording message means, coupled to said control means and said second switching means, for outputting a first recorded message, said second switching means including means for selectively connecting said interface means to said recorded message means; and, incoming call detecting means, coupled to said control means and having means for connection to the telephone line, for detecting an initial incoming call signal on the telephone line denoting an incoming call;

said control means including means for causing said first and second switching means to connect the telephone line to said recorded message means and for causing said recorded message means to output the first recorded message on the telephone line when said incoming call detecting means detects an initial incoming call signal.

3. A terminal device as recited in claim 2, said recorded message means including means for outputting a second recorded passage;

said control means including means for causing said first and second switching means to connect the telephone line to said recorded message means and for causing said recorded message means to output the second recorded message prior to causing the first and second switching means to connect the telephone line to said incoming message recording means.

4. A terminal device as recited in claim 1, the operator intervention signal being a PRI-Q signal.

5. A terminal device as recited in claim 2, the operator intervention signal being a PRI-Q signal.

6. A terminal device as recited in claim 3, the operator intervention signal being a PRI-Q signal.

* * * * *